United States Patent [19]

Chyung et al.

[11] Patent Number: 5,198,302

[45] Date of Patent: Mar. 30, 1993

[54] COATED INORGANIC FIBER REINFORCEMENT MATERIALS AND CERAMIC COMPOSITES COMPRISING THE SAME

[75] Inventors: Kenneth Chyung, Painted Post; Steven B. Dawes; Dale R. Wexell, both of Corning, all of N.Y.

[73] Assignee: Corning Incorporated, Corning, N.Y.

[21] Appl. No.: 512,392

[22] Filed: Apr. 23, 1990

[51] Int. Cl.$^5$ .................... D02G 3/00; B32B 9/00
[52] U.S. Cl. ........................ 428/375; 428/678
[58] Field of Search ................ 501/88, 95, 96; 428/323, 375, 408, 698

[56] References Cited

U.S. PATENT DOCUMENTS

| | | | |
|---|---|---|---|
| 4,376,804 | 3/1983 | Katzman | 428/408 |
| 4,397,901 | 8/1983 | Warren | 428/101 |
| 4,405,685 | 9/1983 | Honjo et al. | 428/368 |
| 4,481,257 | 11/1984 | Suplinskas et al. | 428/366 |
| 4,485,179 | 11/1984 | Brennan et al. | 501/32 |
| 4,589,900 | 5/1986 | Brennan et al. | 65/33 |
| 4,615,987 | 10/1986 | Chyung et al. | 501/8 |
| 4,642,271 | 2/1987 | Rice | 428/698 |
| 4,711,860 | 12/1987 | Gadkaree et al. | 501/9 |
| 4,752,503 | 7/1988 | Thebault | 427/248.1 |
| 4,755,489 | 7/1988 | Chyung et al. | 501/8 |
| 4,935,387 | 6/1990 | Beall et al. | 501/3 |
| 4,948,758 | 8/1990 | Beall et al. | 501/3 |

*Primary Examiner*—Peter A. Nelson
*Attorney, Agent, or Firm*—Kees van der Sterre

[57] ABSTRACT

Silicon nitride reinforcing fibers provided with a protective surface coating comprising a boron nitride base layer and, optionally, an alumina overcoating, and fiber-reinforced ceramic matrix composite products incorporating the protectively-coated fibers, are disclosed. The composites offer significantly improved high temperature strength in combination with low dielectric constant and low dielectric loss characteristics.

19 Claims, No Drawings

COATED INORGANIC FIBER REINFORCEMENT MATERIALS AND CERAMIC COMPOSITES COMPRISING THE SAME

BACKGROUND OF THE INVENTION

The present invention relates to inorganic composite materials of the class generally known as fiber-reinforced ceramic matrix composite materials. The invention includes silicon nitride fibers for such composites which are provided with protective coatings, and improved ceramic composites incorporating such protective coatings.

Fiber-reinforced ceramic matrix composites comprising glass-ceramic matrices are well known. U.S. Pat. No. 4,615,987 discloses silicon carbide fiber reinforced glass-ceramic composites wherein the matrix consists of an alkaline earth aluminosilicate glass-ceramic composition. Similar silicon-carbide-reinforced composites wherein the matrix consists of a barium-modified magnesium aluminosilicate glass-ceramic are reported in U.S. Pat. No. 4,589,900, while U.S. Pat. No. 4,755,489 discloses SiC-reinforced glass-ceramics wherein the glass-ceramic matrix contains excess $Al_2O_3$ and consists predominantly of anorthite in combination with mullite or alumina.

Prospective uses for fiber-reinforced ceramic matrix composites such as described in these and other prior patents and literature include use as a structural element in high temperature environments such as heat engines. Thus the materials to be employed must not only exhibit good strength and toughness at ambient temperatures, but must also retain those desirable physical properties at the elevated temperatures encountered in the operating environment. Temperatures in the range of 700°–1000° C. and highly oxidizing conditions (due to the high-temperature activity of oxygen) are considered representative of such operating conditions.

Certain applications for ceramic matrix composites are anticipated that will require low dielectric constant and loss factor in addition to the high strength and toughness that these materials have traditionally offered. For these applications, lossy carbon or carbide materials cannot be employed, and thus alternative reinforcing materials must be found. One approach, disclosed in U.S. Pat. No. 4,711,860, involves the strengthening of cordierite glass-ceramics with silicon nitride ($Si_3N_4$) whiskers, i.e., very short (<500 μm) length fibrous silicon nitride. However the high-temperature (1200° C.) strengths achieved averaged below 50,000 psi.

An alternative candidate reinforcing material for low loss composites would be silicon nitride fiber. Fibers and/or chopped fibers of silicon nitride with lengths in the millimeter to meter range or longer are available. Unfortunately, silicon nitride reinforcing fibers have thus far provided neither strong composites nor low loss composites of minimum acceptable strength in oxide matrix systems.

The substitution of silicon nitride fibers for silicon carbide fibers in a glass-ceramic matrix material typically provides a composite of unacceptably low strength. We attribute this result to fiber embrittlement and/or strong interfacial bonding caused by interactions occurring between the oxide matrix and the nitride fibers at the high temperatures needed for full consolidation of these composites. Similarly, high dielectric losses have been seen in some nitride-reinforced systems where binder burnout processing was insufficient to completely remove carbonaceous binders from the composite preforms.

It is known to provide coatings on fiber reinforcement to be incorporated in composite materials in order to modify the behavior of the materials or the fibers therein. For example, U.S. Pat. No. 4,642,271 suggests boron nitride coatings for silicon carbide and other fiber reinforcement for ceramic matrix materials such as $SiO_2$, $ZrO_2$, mullite, and cordierite. In $SiO_2$ systems, high-temperature strength and toughness were improved utilizing SiC reinforcing fibers coated with BN, although this effect was not observed for all fibers in all matrix systems.

Other coating systems and coating/matrix combinations are also known. U.S. Pat. No. 4,376,804, for example, describes carbon fibers coated with a metal oxide film intended to improve fiber adhesion and wetting by a molten metallic matrix material. U.S. Pat. No. 4,397,901 describes a composite wherein a woven or non-woven fiber substrate of carbon fibers is provided with a multi-layer carbon/silicon/silicon carbide coating to provide a composite article resistant to corrosive conditions. U.S. Pat. No. 4,405,685 describes a similar coating system for carbon fibers wherein an inner coating of carbon and a selected metal carbide with an outer coating of the metal carbide are used. This coating system is intended to provide enhanced fiber protection for fibers to be embedded in ceramic or, particularly, in metal matrix materials.

U.S. Pat. No. 4,481,257 discloses silicon carbide monofilaments coated with boron or boron carbide and exhibiting improved strength and bonding when used with metal or epoxy matrix materials. U.S. Pat. No. 4,485,179 describes the use, in a ceramic matrix composite comprising silicon carbide fibers, of an agent added to the matrix to reduce interaction with the silicon carbide fibers. Tantalum or niobium compounds are useful for this purpose.

While the foregoing patents and literature indicate a general interest in the development of coatings for fibers to be employed for the reinforcement of composite glass, metal and ceramic materials, no coating system has yet been developed which effectively protects and preserves the theoretical strengthening capacity of silicon nitride fibers in oxide ceramic matrix materials. Nor has any procedure for making high-strength nitride-fiber-reinforced ceramic composites been developed wherein the potential low dielectric loss characteristics of nitride-oxide materials are effectively preserved.

It is therefore a principal object of the present invention to provide a fiber-reinforced ceramic matrix composite comprising silicon nitride reinforcing fibers which exhibits improved strength and resistance to embrittlement under adverse high temperature conditions.

It is a further object of the invention to provide a method for making silicon nitride-reinforced glass-ceramic matrix composites which provides products of improved strength and reduced dielectric loss.

It is a further object of the invention to provide novel and improved protective coating systems for silicon nitride fibers utilized for ceramic matrix reinforcement, particularly glass-ceramic matrix reinforcement, and coated fibers incorporating such coatings.

Other objects and advantages of the invention will become apparent from the following description thereof.

SUMMARY OF THE INVENTION

The present invention is founded upon the discovery of new fiber coating systems which substantially improve the effectiveness of silicon nitride fibers as a reinforcing medium for the strengthening of oxide-based ceramic materials. The coatings of the invention provide an adherent and cohesive protective layer which is effective, in a ceramic matrix, to preserve the inherent strength of silicon nitride fibers without degrading the low dielectric loss characteristics thereof. At the same time, the coating systems are physically and chemically compatible with composite ceramic matrix materials and with the binders and consolidation processing used to make ceramic composites.

In a first aspect, then, the invention includes coated silicon nitride fibers having a protective surface coating, wherein the surface coating comprises a boron nitride layer on the fiber and, optionally, an aluminum oxide overcoating applied over the boron nitride layer. The boron nitride coating consists essentially of boron nitride but may comprise impurity levels up to about 10% by weight of carbon and/or oxygen.

In another aspect, the invention includes a fiber-reinforced ceramic matrix composite article and a method for making it, which exhibits both high-temperature strength and low dielectric loss. The article comprises a ceramic matrix selected from the group consisting of oxide glasses and glass-ceramics in which are disposed coated silicon nitride reinforcing fibers having a low-loss protective coating thereon. The low-loss protective coating comprises a boron nitride base layer and, optionally, an aluminum oxide layer or overcoating applied over the boron nitride layer.

The method for making the fiber-reinforced ceramic matrix composite article of the invention includes the steps of, first, providing a fiber reinforcement material consisting of or including silicon nitride fibers coated with boron nitride and, optionally alumina. These fibers are then combined in the known fashion with a selected ceramic matrix material, preferably by combining the fibers with a mixture comprising the matrix in particulate form in admixture with a flowable vehicle which typically includes one or more fugitive organic constituents. The fibers and matrix materials are then shaped to form a unitary composite preform.

The composite preform thus provided is next heated to expel the fugitive organic vehicle constituent(s) therefrom, and is then consolidated under heat and pressure to remove voids and provide a dense ceramic matrix composite article. However, to achieve the required combination of low dielectric loss and high strength in the final product, the step of heating to expel the binder is carefully controlled. Most preferably, heating is carried out in an oxidizing atmosphere which is essentially free of water vapor, since water has been found to have the highest potential for damaging the protective fiber coating.

In yet another aspect, the invention includes a method for treating silicon nitride fiber to improve the stability thereof in an oxide ceramic matrix which comprises the step of depositing onto the surface of the fiber a low-loss protective coating comprising a boron nitride layer and, optionally, thereafter depositing an aluminum oxide layer on to the boron nitride layer.

In the preferred method, the boron nitride layer is deposited on the surfaces of the silicon nitride fiber by chemical vapor deposition, while the optional alumina layer is deposited on the fiber by coating with an aluminum-containing solution or suspension. Most preferably, a liquid coating medium comprising one or more organometallic precursors of alumina is applied to the surface of the boron-nitride-coated fiber, and the fiber is then heat treated to convert the precursors to alumina.

While not intending to be bound by any particular explanation respecting the mode of operation of the invention, the boron nitride coating appears to provide an effective barrier against attack on the fiber by the matrix material. The alumina coating, if present, is considered to provide added durability to the coating system, i.e., it may operate to protect the relatively soft BN coating from physical damage during the processing of a composite preform, and also to protect the BN coating from harmful chemical interactions with the matrix during hot pressing.

The invention yields silicon nitride fiber-reinforced ceramic matrix composites with high-temperature strengths which are greatly improved over those provided without the protective coatings of the invention. Strengths achieved in the preferred glass-ceramic matrix materials are well in excess of 40 ksi at 1000° C., and in the strongest materials can be in excess of 100 ksi in the 1000°–1300° C. range. These results are in marked contrast with values on the order of 10–20 ksi which are more typical of similar composites incorporating uncoated silicon nitride fibers. At the same time, composites exhibiting dielectric constants not exceeding 9, more typically not exceeding about 7, and with dielectric losses below about 1 and most preferably not exceeding about 0.2 at 9.6 GHz can be provided in these composite systems.

DETAILED DESCRIPTION

The invention is not believed to be limited in its application to any particular type of silicon nitride fiber or ceramic matrix material. In the case of the fiber, silicon nitride fibers have recently become commercially available and the commercial fibers can be effectively coated in accordance with the invention. An example of a suitable commercial fiber, presently preferred, is HPZ silicon nitride fiber commercially available from the Dow-Corning Corporation, Midland, Mich. 48686.

The selection of a ceramic matrix material for reinforcement with fibers comprising protective coatings in accordance with the invention is likewise not critical. For applications requiring the best high temperature performance, refractory alkaline earth aluminosilicate glass-ceramics are normally preferred, with calcium aluminosilicate glass-ceramics being particularly preferred for applications requiring a low dielectric loss composite.

Among the types of glass-ceramics which could be used are those disclosed in U.S. Pat. No. 4,615,987. Those include glass-ceramics wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

Other refractory alkaline earth aluminosilicate glass-ceramics include those comprising a predominant crystal phase consisting essentially of triclinic anorthite in admixture with at least one of mullite and alpha alumina, these glass-ceramics being disclosed in U.S. Pat. No. 4,755,489. Further, U.S. Pat. No. 4,464,475 discloses alkaline earth aluminosilicate glass-ceramics wherein the principal crystal phase is selected from the group consisting of barium osumilite, cordierite, and stuffed cordierite, the ions comprising the stuffing ions in the stuffed cordierite compositions being selected from the group consisting of Ba, Ca and Sr. Barium-stuffed cordierite glass-ceramics, in particular, exhibit relatively low coefficients of thermal expansion and high elastic moduli.

For somewhat less demanding applications, matrix materials comprising lithium or zinc aluminosilicate glass-ceramics may be selected. U.S. Pat. No. 4,554,197 describes the use of glass-ceramic matrix materials of this type, which may also contain magnesium but which are typically essentially free of $TiO_2$. These glass-ceramics are characterized by the presence of a principal crystal phase selected from the group consisting of beta-quartz solid solution (sometimes referred to as beta-eucryptite solid solution) and beta-spodumene solid solution.

Finally, the coated fibers of invention can be utilized for the strengthening and/or toughening of glass matrix materials, particularly including alkali-free alkaline earth aluminosilicate glasses. These glasses are preferably substantially free of alkali metal oxides such as $Na_2O$, $Li_2O$, and $K_2O$, and include one or more alkaline earth metal oxides selected from the group consisting of CaO, MgO, SrO and BaO.

The application of a boron nitride coating on the selected silicon nitride fiber reinforcement material can be carried out by conventional chemical vapor deposition techniques. Thus the selected fiber may be positioned in a vacuum chamber and contacted with mixtures of boron and nitrogen source gases such as $BCl_3$, borazine and ammonia. Contact will be carried out at a temperature sufficiently high that source compound decomposition and BN formation will occur directly on the surfaces of the fibers. This is analogous to the coating procedure described in U.S. Pat. No. 4,642,271 for silicon carbide fibers.

As previously noted, the deposition of an optional alumina coating to BN-coated silicon nitride fibers in accordance with the invention is most preferably accomplished through the use of solutions or liquid sols of organometallic source compounds for the overcoatings. While other methods of deposition, such as vapor deposition, powder coating, gel coating or the like may alternatively be used for the application of alumina, solution or sol coating insures minimal chemical or physical damage to the BN base coating and offers excellent composition control, fiber coverage, and coating homogeneity.

The preferred organometallic source compounds for the solution coating of fibers as described are the aluminum alkoxides. However, other organometallic compounds forming stable solutions or sols in aqueous or non-aqueous media may alternatively be used.

As known in the art, reinforcing fibers with or without selected coatings can conveniently be incorporated into glass-ceramic matrix materials such as above described if the matrix materials are provided as glasses in particulate or powdered form. Such particulate matrix materials may readily be produced from glasses by drigaging, grinding and/or milling, with the glass powders thus produced being readily applied to the fibers in the form of liquid suspensions of the powders. Typically, these suspensions comprise dispersants and binder constituents in addition to the glass powders, and are applied by spraying or immersion of fibers or fiber tows or mats into the suspensions.

Fiber mats or tows impregnated with powdered glass as described may then be pressed or wound onto drums to provide green sheets or prepregs of the glass-impregnated fibers. These may then be stacked, if desired, and heated to achieve burnout of organics present in the coating vehicle.

For low dielectric loss applications, the presence of organic dispersants, binders and/or solvents in the preform fabrication process, together with the presence of boron nitride on the fiber surfaces, require that careful attention be paid to the processing used for binder burnout. The complete removal of organics and carbonaceous residues thereof is of course required to secure low dielectric loss, but the nitride coating must at the same time be protected from harmful oxidation which can occur when overly aggressive burnout conditions are employed.

The use of a conventional nitrogen atmosphere during the binder burnout process would completely preserve the protective boron nitride fiber coating, but is not practical where low dielectric loss composites are required. This is because nitrogen burnout leaves excessive residual carbon in the composite material. The residue may be found in the porous matrix phase or as a carbon coating on the coated nitride fibers, and tends to increase the dielectric constant and dielectric loss of the composite.

Dry air, i.e., air which is substantially or essentially free of water vapor, is presently the preferred atmosphere for achieving a proper balance of binder burnout with nitride coating and fiber oxidation protection. Oxidation of the boron nitride coating is found to proceed slowly, if at all, in the absence of water vapor at temperatures below about 600° C. Yet dry air provides sufficient oxidizing activity to effect a substantially complete removal of carbonaceous binder residues from the porous prepreg.

Following binder burnout, consolidation of the composite prepregs or stacks thereof is typically accomplished by a hot pressing process during which the temperature of the prepreg is raised above the softening temperature of the glass and pressure is applied to eliminate voids in the material and produce a dense composite. In the case of glass-ceramic matrix materials, crystallization of the matrix material to effect conversion to a glass-ceramic matrix is usually achieved concurrently with consolidation in the course of the hot pressing process.

Without being intended in any way as a limitation on the invention, the following Example illustrates a preferred general procedure for the fabrication of silicon-nitride-fiber-reinforced ceramic matrix composites in accordance therewith.

EXAMPLE

A commercial grade of silicon nitride fiber is first selected for use in composite fabrication. The material selected is Dow Corning HPZ fiber tow. Fabricated by pyrolysis of a polymeric precursor, this fiber material has a stoichiometry which is primarily $Si_3N_4$. Carbon and oxygen impurities, which are generally present in these fibers, comprise not more than about 10% by weight. The fibers are oval shaped, having diameters on the order of 10 micrometers and single fiber tensile strengths in the range of 200–480 Ksi. Tensile moduli are about 30 Msi, with dielectric constants of approximately 6.0–6.4 and dielectric loss factors below about 0.1. The fibers are provided by the supplier as fiber tows comprising approximately 800 fibers per tow.

The fiber tows thus selected are next provided with boron nitride coatings or with combination coatings comprising a base layer of boron nitride with an overcoating of alumina. The boron nitride coatings are applied by a commercial coating supplier using known methods of chemical vapor deposition. The preferred commercial coating source is Synterials Company of Herndon, Va., USA. The boron nitride coatings thus provided are typically 0.1–0.4 μm in thickness, most frequently 0.1–0.2 μm in thickness, and contain less than 10 atom % of carbon and oxygen impurities as determined by x-ray photoelectron spectroscopy analysis (ESCA). There is some evidence that somewhat thicker coatings in this range can enhance the ultimate strength of the composite material.

Alumina overcoatings are next applied to some of the fibers by a solution coating method. A sol is first prepared containing 8 grams of aluminum isopropoxide dissolved in 196 ml ethanol (neat) and 8 ml of concentrated nitric acid. The sol as prepared is clear and colorless.

Selected boron-nitride-coated fiber tows are then drawn through the sol at a speed of about 10 ft/min, and then transported directly and sequentially through two tube furnaces. The furnaces are operating at temperatures of 200° C. and 300° C., respectively, with the residence time of the fiber tow in each furnace being about 20 seconds. This sol immersion and heating procedure is repeated once more to double the thickness of the alumina overcoating provided on the fiber tow.

Examination of the coated fibers produced in accordance with the above process indicates that the boron nitride coatings, as well as the coatings of boron nitride with alumina overcoatings are smooth and adherent. The alumina overcoatings, which can range in thickness up to about 2000 Å, provide at least 70% and ranging up to 100% coverage of the underlying boron nitride base coatings.

To incorporate the coated fibers into ceramic matrix preforms, a slurry of a powdered calcium aluminosilicate glass, the glass being of a composition which is thermally crystallizable to a fine-grained aluminosilicate glass-ceramic, is first provided. The glass used in the slurry has a composition of about 39.5% $SiO_2$, 34.6% $Al_2O_3$, 18.6% CaO, 3.0% $ZrO_2$, and 0.5% $As_2O_3$, and is thermally crystallizable to yield a glass-ceramic with anorthite as the principal crystalline phase and alumina and mullite as minor crystal phases.

The slurry contains the powdered glass together with an alcohol vehicle and a polyvinyl butyral binder, the binder being present in a proportion of about 40% by weight of the slurry. To coat the fibers, the fiber tow is drawn into the slurry and then transported out of the slurry through a stripping die of 0.040–0.050 inches hole size to strip excess slurry from the fibers. The coated fiber is then wound on a collection drum, dried, and then cut from the drum to provide prepreg sheet comprising substantially uniaxially aligned fibers in a glass-binder mixture.

Preforms for fiber-reinforced composite plates are next fabricated by stacking sections cut from the prepreg sheet produced as described to produce stacks of 8–12 sheets. These are then consolidated and thermally crystallized by hot pressing to produced dense, fully consolidated composite bodies.

To minimize residual carbon in the consolidated composites while preserving the advantageous interface characteristics of the fiber coatings, a dry air burnout procedure prior to consolidation is used. The prepreg lay-ups are placed in an oven that had first been purged of moisture by heating with dry nitrogen atmosphere overnight. A source of dry air is then attached to the furnace to provide a dry oxidative environment.

The stacked composite preforms are burned out in this furnace by heating to 500°–550° C. for one hour, followed by cooling with continued flow of dry air. A careful surface analysis of coated fibers taken from prepreg sheets burned out in this manner by ESCA analysis shows a surface composition which comprises, in weight percent, less than 8% of residual carbon and more than 75% of BN remaining from the original base coating. This is in direct contrast to surface carbon levels of 60% and retained BN coating concentrations of 25% which are typically observed when nitrogen burnout procedures are used.

Examination of the powdered glass matrix material present in the burned out prepreg shows a completely white material, establishing that essentially complete removal of binder materials and carbonaceous residues is achieved on burnout. Hence the matrix is essentially free of tan or grey discoloration which is a very sensitive indicator of carbon residue in these preforms.

At the completion of the burnout cycle the composite preforms are consolidated by hot pressing to maximum temperatures in the range of 1100° C. to 1450° C. and peak consolidation pressures in the range of 1000–2000 psi. To minimize the possibility of carbon contamination, the graphite pressing molds are heat-cleaned at 1450° C. under nitrogen. The samples are then loaded into the press, and the press is evacuated and preheated to temperatures of 750°–850° C. while flushing with dry nitrogen. Finally, the samples are heated under nitrogen or a vacuum to the selected peak consolidation temperature, while increasing the pressure to the selected maximum consolidation pressure, held under those conditions for 10 minutes to 2 hours to achieve complete consolidation, and finally cooled and depressurized to ambient over time intervals of 1–3 hours.

Table I below sets forth burnout and consolidation process parameters for composite ceramic plates provided in accordance with the above described fabrication procedure. Included in Table I for each of the articles fabricated are an indication of the composition of the protective coating, whether BN only or BN with $Al_2O_3$ overcoating, an indication of the burnout atmosphere used, a report of the peak consolidation temperature and pressure employed for the consolidation process, and the density of the resulting consolidated article.

TABLE I

| | | Composite Fabrication | | | |
|---|---|---|---|---|---|
| Sample No. | Coating Comp. | Burnout Atm. | Consol. Temp. | Consol. Press. | Consol. Density |
| 1 | BN | Air | 1346° C. | 1500 psi | 2.63 g/cc |
| 2 | BN | Air | 1231° C. | 1500 psi | 2.64 g/cc |
| 3 | BN | Air | 1348° C. | 2000 psi | 2.66 g/cc |
| 4 | BN | Air | 1207° C. | 1500 psi | 2.63 g/cc |
| 5 | BN | Air | 1205° C. | 2000 psi | 2.63 g/cc |
| 6 | BN/$Al_2O_3$ | Air | 1205° C. | 1500 psi | 2.54 g/cc |
| 7 | BN/$Al_2O_3$ | Air | 1259° C. | 1500 psi | 2.55 g/cc |

TABLE I -continued

| | | Composite Fabrication | | | |
|---|---|---|---|---|---|
| Sample No. | Coating Comp. | Burnout Atm. | Consol. Temp. | Consol. Press. | Consol. Density |
| 8 | BN/Al$_2$O$_3$ | Air | 1256° C. | 2000 psi | 2.56 g/cc |
| 9 | BN/Al$_2$O$_3$ | Air | 1349° C. | 1500 psi | 2.60 g/cc |
| 10 | BN/Al$_2$O$_3$ | Air | 1309° C. | 1500 psi | 2.59 g/cc |
| 11 | BN/Al$_2$O$_3$ | Air | 1252° C. | 1500 psi | 2.56 g/cc |
| 12 | BN/Al$_2$O$_3$ | Air | 1252° C. | 1500 psi | 2.57 g/cc |
| 13 | BN/Al$_2$O$_3$ | Air | 1208° C. | 1500 psi | 2.54 g/cc |
| 14 | BN/Al$_2$O$_3$ | Air | 1256° C. | 1500 psi | 2.58 g/cc |

The fabrication process employed for the preparation of the composite plates reported in Table I above typically provides composites wherein the volume percent of fiber reinforcement is in the range of 25-45%. Theoretical densities for these composites are in the range of 2.6-2.7; thus in most cases consolidation of the composite preforms to within 95% of theoretical density for the composite is achieved.

Composite plates such as characterized in Table I above are tested to determine the strength and elasticity of the fiber-reinforced materials, and to evaluate the composites for dielectric constant and loss properties. Strengths and elastic yields are determined in 4-point bending tests on small bar samples cut from the composite plates. Dielectric losses are determined at 9.6 GHz, and are measured for the case of wave front orientation parallel to the disposition of the fibers in the samples and for wave front orientaiton perpendicular thereto.

Table II below sets forth data resulting from strength and dielectric properties evaluations on samples comprising BN coatings with no alumina overcoatings made in accordance with the procedures reported in the Example and in Table I. Included in Table II for each of the samples tested are data respecting the temperature at which the strength tests were carried out (Test Temp.), the ultimate failure stress (S$_{ult}$) measured on the samples, the percent elongation of the samples at the point of stress failure (E$_{ult}$), the flexural modulus of elasticity (E$_B$) for most samples as determined over the range of elastic flexure, the dielectric constant K' of the fiber-reinforced samples, and dielectric losses measured parallel to (K$_=$) and perpendicular (K$_\perp$) to the direction of alignment of the reinforcing fibers in the samples.

TABLE II

| | BN-Coated Si$_3$N$_4$-Reinforced Composites | | | | | |
|---|---|---|---|---|---|---|
| Sample No. | Test Temp. | S$_{ult}$ Ksi | ε$_{ult}$ (%) | E$_B$ Msi | Dielec. Const K' | Dielec. Loss Factors K$_=$/K$_\perp$ |
| 1 | 25 | 9 | 0.07 | 12.8 | 9.1 | 1.4/0.14 |
|  | 1000 | 12 | 0.15 | 9.6 | 8.6 |  |
| 2 | 25 | 33 | 0.24 | 14.1 | 8.6 | 0.31/0.11 |
|  | 1000 | 42 | 0.53 | 9.0 | 8.5 |  |
|  | 1200 | 46 | 0.87 | — |  |  |
| 3 | 25 | 12 | 0.10 | 13.1 | 9.0 | 0.86/0.15 |
|  | 1000 | 28 | 0.28 | 10.2 | 8.8 |  |
|  | 1200 | 37 | 0.68 | 6.6 |  |  |
| 4 | 25 | 25 | 0.18 | 14.2 | 7.4 | 1.03/0.12 |
|  | 1000 | 63 | 0.80 | 8.5 | 7.0 |  |
|  | 1200 | 54 | 0.61 | — |  |  |
| 5 | 25 | 22 | 0.19 | 13.8 | 6.3 | 0.12/0.22 |
|  | 1000 | 42 | 0.50 | 8.4 | 6.9 |  |
|  | 1200 | 76 | 1.66 | 6.8 |  |  |

The physical property data set forth in Table II are notable in several respects. First, although the ambient temperature strengths of the composites are typically not exceptionally high, significantly increased strength levels are in many case attained at the 1000° and 1200° C. test temperatures which are of particular interest. Moreover, where high temperature weakness was observed in isolated samples, this behavior was found to be caused by inhomogeneous fiber distribution in the matrix (excess matrix material forming fiber-deficient layers), rather than by adverse chemical interactions in the material. Thus flexural strengths significantly above 40 Ksi at 1000° C. are considered to be a characteristic property of these materials.

The dielectric performance of the samples is also noteworthy. The reported dielectric constants of samples 1-3, which due to instrument error are probably one unit larger than actual, are still below about 9, whereas samples 4-5, which demonstrate dielectric behavior more typical of this type of composite, have dielectric constants of 6.3-7.4. Thus these materials are also characterized by dielectric constants generally below about 8. At the same time, dielectric losses in the range of 0.1-1.5 were observed, with the best materials having losses below about 0.3 regardless of sample orientation.

This performance contrasts markedly with the dielectric behavior of similarly constructed samples wherein binder burnout is carried out under nitrogen. For the latter composites, probably due to excess carbon retention, dielectric constants in excess of 100 have been routinely measured.

Finally, the composites described in Table II exhibit a flexural failure mode during high-temperature strength testing wherein fracture surfaces of woody or fibrous appearance are generated. This fracture mode is indicative of the retention of substantial high-temperature toughness as well as strength in these materials.

Although the strength levels attained in composites comprising silicon nitride fibers with BN coatings alone represent a significant advance for low dielectric composites, still higher strength levels are attainable where fibers comprising alumina overcoatings on the BN base layers are used. Table III below reports strength test data for composite plates produced in accordance with the procedure of the Example and Table I, but comprising combination BN/Al$_2$O$_3$ coatings.

TABLE III

| | BN/Al$_2$O$_3$-Coated Si$_3$N$_4$-Reinforced Composites | | | | | |
|---|---|---|---|---|---|---|
| Sample No. | Test Temp. | S$_{ult}$ Ksi | ε$_{ult}$ (%) | E$_B$ Msi | Dielec. Const K' | Dielec. Loss Factors K$_=$/K$_\perp$ |
| 6 | 25 | 82 | 0.79 | 14.0 | 7.86 | 0.66/0.18 |
|  | 1000 | 107 | 1.28 | 11.1 | 6.63 |  |
|  | 1200 | 87 | 1.46 | 7.6 |  |  |
|  | 1300 | 74 | 1.55 | 5.8 |  |  |
| 7 | 25 | 69 | 0.51 | 16.0 | 7.60 | 0.54/0.11 |
|  | 1000 | 116 | 1.11 | 11.5 | 7.13 |  |
|  | 1200 | 87 | 1.13 | 7.9 |  |  |
|  | 1300 | 110 | 1.74 | 6.7 |  |  |
| 8 | 25 | 58 | 0.48 | 13.5 | 7.45 | 0.33/0.23 |
|  | 1000 | 110 | 1.15 | 11.7 | 7.28 |  |
|  | 1200 | 87 | 1.29 | 8.6 |  |  |
|  | 1300 | 90 | 2.08 | 6.9 |  |  |
| 9 | 25 | 42 | 0.46 | 10.9 | 7.1 | 0.16/— |
|  | 1000 | 67 | 0.74 | 10.0 |  |  |
| 10 | 25 | 58 | 0.47 | 14.4 | 7.1 | 0.20/— |
|  | 1000 | 96 | 1.00 | 10.9 |  |  |

One factor which is quite evident from a study of the test data in Table III is that composite plates wherein the silicon nitride reinforcing fibers are provided with a BN coating in combination with an alumina overcoating exhibit unexpectedly high strength, even when compared with similar composites incorporating BN coatings alone. Hence, ultimate flexural strengths for these samples ranged from 50 to 85 Ksi at 25° C., and from 105 to 115 Ksi at 1000° C. The 1200° C. flexural strengths were as high as 90 Ksi, while in the 1300° C. tests, stress levels of 110 Ksi were reached in spite of the onset of matrix deformation.

Moreover, the fracture surfaces of these composites, which are fibrous at room temperature, remain woody to fibrous at higher temperatures, a good indicator of high retained toughness. Thus the high temperature performance of these composites compares very favorably with that of the strongest known silicon carbide fiber-reinforced glass-ceramics, but with the added benefit of a low dielectric constant and a low loss tangent.

Dielectric performance in the composites shown in Table III, though not quite as favorable as for composites comprising BN-coated nitride fibers, remain exceptional. Hence, for the samples tested, dielectric constants ranged between 6.6 and 7.8, while loss factors ranged between 0.1 and 0.7. In all cases the loss tangent measured in the parallel configuration were higher than those measured in the perpendicular configuration, a factor presently attributed to the carbon impurity level in the BN base coatings. Of course, inclusion of alumina is expected to somewhat increase the dielectric constant of the system in any case, since alumina itself has a dielectric constant of about 9.

Similar dielectric testing of the composite plates reported as Samples 11-14 of Table I further clarify the role of carbon in determining the final dielectric properties of these composites. Samples 11-14 were made from silicon nitride fiber tow comprising a lower carbon impurity level, as determined by ESCA analysis of the fiber surface, than the impurity levels in the previously utilized fibers. The result was that measured loss factors for the samples, even with wave front parallel to the direction of fiber reinforcement, did not exceed about 0.15, with a number of loss values below 0.10 being recorded.

Although for reasons not fully understood, high temperature strength levels in these samples were somewhat reduced, in all cases ultimate stress values well in excess of 60 ksi in the 1000°–1200° C. temperature range were recorded for unidirectionally reinforced composites. Moreover, ultimate strengths in excess of 40 ksi were obtained for composite plates of 0°/90° crossply fiber construction, with similar dielectric performance.

As the above data indicate, ceramic matrix composites provided in accordance with the invention provide significant advantages over other candidate low dielectric ceramic composites with respect to strength and/or refractoriness. For example, when compared with materials such as mullite- or alumina-fiber-reinforced ceramics, the composites of the invention possess two to five times the ultimate strength, as well as much greater refractoriness.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A silicon nitride fiber comprising a surface coating of boron nitride.

2. A silicon nitride fiber in accordance with claim 1 wherein the surface coating of boron nitride is provided with a covering layer of alumina.

3. A silicon nitride fiber tow wherein the silicon nitride fibers comprise a surface layer of vapor-deposited boron nitride.

4. A silicon nitride fiber tow in accordance with claim 3 wherein the surface layer of boron nitride is covered by an overcoating of alumina.

5. A fiber-reinforced ceramic matrix composite article exhibiting high-temperature strength and toughness comprising a ceramic matrix selected from the group consisting of glasses and glass-ceramics in which are disposed reinforcing silicon nitride fibers having a protective surface coating of boron nitride.

6. A fiber-reinforced ceramic matrix composite article in accordance with claim 5 wherein the protective surface coating of boron nitride is covered by an overcoating of alumina.

7. A fiber-reinforced ceramic matrix composite article in accordance with claim 5 wherein the ceramic matrix is selected from the group of refractory alkaline earth aluminosilicate glass-ceramics.

8. A fiber reinforced ceramic matrix composite article in accordance with claim 7 wherein the ceramic matrix is an alkaline earth aluminosilicate glass-ceramic matrix wherein the predominant crystal phase is selected from the group of anorthite ($CaO.Al_2O_3.2SiO_2$) and its pseudo-binaries with mullite ($3Al_2O_3.SiO_2$), cordierite ($2MgO.2Al_2O_3.5SiO_2$), barium osumilite ($BaO.2MgO.3Al_2O_3.9SiO_2$), albite solid solution ($Na_2O.Al_2O_3.6SiO_2$), $Al_2O_3$, $SiO_2$, $CaO.SiO_2$, and gehlenite ($2CaO.Al_2O_3.SiO_2$).

9. A fiber reinforced ceramic matrix composite article in accordance with claim 6 wherein the ceramic matrix is an alkaline earth aluminosilicate glass-ceramic matrix wherein the predominant crystal phase consists essentially of triclinic anorthite in combination with at least one of mullite and alpha alumina.

10. A fiber reinforced ceramic matrix composite article in accordance with claim 6 wherein the ceramic matrix is an alkaline earth aluminosilicate glass-ceramic matrix wherein the principal crystal phase is selected from the group consisting of barium osumilite, cordierite, and stuffed cordierite, the ions comprising the stuffing ions in the stuffed cordierite compositions being selected from the group consisting of Ba, Ca and Sr.

11. A fiber reinforced ceramic matrix composite article in accordance with claim 5 wherein the ceramic matrix is a lithium, or zinc aluminosilicate glass-ceramic matrix wherein the principal crystal phase is selected from the group consisting of beta-quartz/beta-eucryptite solid solution and beta-spodumene solid solution.

12. A fiber reinforced ceramic matrix composite article in accordance with claim 5 wherein the ceramic matrix is an alkali-free alkaline earth aluminosilicate glass including at least one alkaline earth metal oxide selected from the group consisting of CaO, MgO, SrO and BaO and being essentially free of $Na_2O$, $Li_2O$, and $K_2O$.

13. A fiber reinforced ceramic matrix composite article in accordance with claim 5 which has a dielectric constant not exceeding about 9 and a dielectric loss not exceeding about 1 at 9.6 GHz.

14. A method for treating a silicon nitride fiber to improve the oxidation resistance or bonding characteristics thereof to an encapsulating ceramic material which comprises the step of depositing onto the surface of the fiber a boron nitride surface coating.

15. A method in accordance with claim 14 which comprises the further step of depositing onto the boron nitride surface coating an alumina overcoating.

16. A method in accordance with claim 14 wherein the boron nitride surface coating is deposited on the fibers by chemical vapor deposition.

17. A method in accordance with claim 15 wherein the alumina overcoating is deposited on the boron nitride surface coating by the steps of:
   providing on the boron nitride coating a liquid coating comprising an organometallic precursor of aluminum oxide, and
   pyrolyzing the liquid coating to convert the precursor to alumina.

18. A method for making a fiber-reinforced ceramic matrix composite article comprising the steps of: providing a fiber reinforcement material comprising silicon nitride fibers coated with boron nitride and, optionally, an alumina overcoating; combining the fibers with a mixture comprising a particulate ceramic material and at least one fugitive organic vehicle constituent to form a unitary composite preform; heating the composite preform to expel the fugitive organic vehicle constituent therefrom; and consolidating the preform under heat and pressure to obtain a dense fiber-reinforced composite article, wherein the step of heating the composite preform to expel the fugitive organic vehicle therefrom is carried out in an oxidizing atmosphere which is essentially free of water vapor.

19. A method in accordance with claim 18 wherein the particulate ceramic material is a powder glass which is thermally crystallizable to an aluminosilicate glass-ceramic.

* * * * *